P. HILDRETH.
Wheel-Cultivator.
No. 53,445
Patented Mar. 27. 1866.
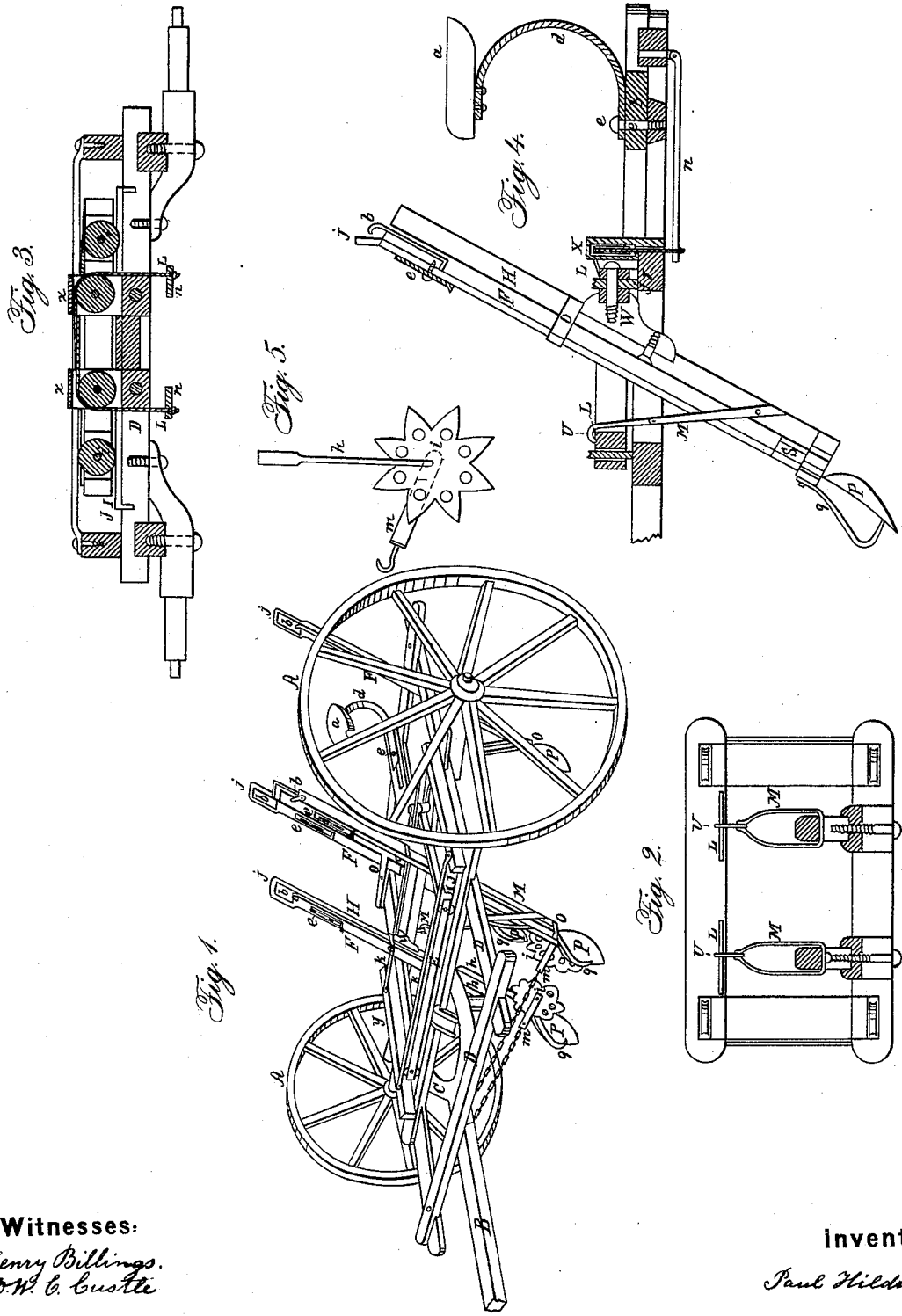
Witnesses:
Henry Billings.
D. W. C. Custle
Inventor:
Paul Hildreth

UNITED STATES PATENT OFFICE.

PAUL HILDRETH, OF BELOIT, WISCONSIN.

IMPROVEMENT IN CULTIVATORS.

Specification forming part of Letters Patent No. 53,445, dated March 27, 1866.

*To all whom it may concern:*

Be it known that I, PAUL HILDRETH, of Beloit, county of Rock, in the State of Wisconsin, have invented certain new and useful Improvements in Corn-Cultivators, and which may be used for cultivating corn, sorgum, broom-corn, cotton, or for the tillage of any crop planted or sown in rows or hills; and I do hereby declare that the following is a full, clear, and exact description thereof, which will enable any one skilled in the art to make and use the same, reference being had to the accompanying drawings, and to the letters of reference marked thereon, and making a part of this specification, in which—

Figure 1 is a perspective view of the machine. Fig. 2 is a top view of the carriage. Fig. 3 is a sectional view taken crosswise in rear of the axle. Fig. 4 is a sectional view of the machine through the center lengthwise, and Fig. 5 is a side view of the shields.

Similar letters of reference indicate like parts.

This invention relates to a new and improved method of constructing cultivators, at once novel and simple in arrangement, economy of production, and ease of control by the operator, when in use.

The manner of constructing my machine will be clearly understood by the drawings aforesaid and the said letters of reference marked thereon, described as follows, to wit:

A A represent the wheels; B, the tongue; D D, the main frame; E, the movable or vibrating carriage supporting the two forward cultivator-bars F F, which are moved laterally right or left by the treadles N N, controlled by the feet of the operator, actuating the cords or chains L L, which pass over the pulleys X X, one end of each of said cords being attached to either front corner of the said carriage E, which moves on tracks J, constructed as shown by suitable rods, I, of the said tracks J, laid on the main frame D D, and also above the said carriage E. The ends of the said upper rods are fixed to the end pieces, *y y*. Said track-rods act as guides to the track-pulleys in the frame of the said carriage E, working loosely in the grooves thereof.

The forward cultivator-bars are attached to the hinder beam of the carriage E by brackets W W, fitted to said beam, secured by set-screws through lateral slots, so that said cultivator-bars may be set wide or narrow, to suit the width of rows, which also, by the use of said treadles N N, may be moved rapidly from side to side in crooked rows or to avoid obstructions. Said cultivator-bars F F are attached to bed-pieces H H by clasps O O. The bed-pieces are secured to the brackets W W by suitable screws. The cultivator-bars F F move freely in the said clasps O O, as required, said clasps O O being secured to the said bed-pieces H H, said cultivator-bars F F having adjustable gages *e e*, which regulate the depth of the blades or shovels, which are provided with scrapers Q Q, and handles *j j* at the upper ends, so that in case the blades or shovels become foul with weeds, stalks, or otherwise, the operator may with ease draw the blades or shovels out of the ground, at once removing the obstruction without hinderance or delay to the work in hand.

Said cultivator-bars F F are provided with draft-rods M M, which are fixed to the said bed-pieces H H, and the forward ends of which hook loosely on suitable rods L, secured on the top of the rear edge of the front beam of the said carriage E by the said hooks (marked U U,) to allow the said cultivator-bars to be adjusted wide or narrow, as aforesaid.

The cultivator blades or shovels P P have round shanks S S, which are inserted into the feet of the cultivator-bars F F, and held in position by set-screws *q q*. The blades or shovels P P may therefore be turned to any desired angle, so as to throw the earth to or from the growing plants.

The revolving star-shields *i i*, attached to the lower ends of the vibrating rods *h h*, supported by the draft chains and hooks *m m*, protect the plants from being covered with earth or otherwise harmed.

The upper ends of the cultivator-bars F F are provided with spring-catches *b b*, so that when the said bars F F are drawn up the said catches are firmly fixed to the ratchets in the front upper ends of the said bed-pieces H H, thereby freeing the cultivators from contact with the ground when not in use.

The hinder cultivators or cultivator-bars are constructed and arranged precisely similar to the forward ones, except having no movable carriage, but are adjustable by set-screws in lateral slots, same as the others.

The blades or shovels act independently of each other, moving freely in the said clasps O O on the said bed-pieces H H, up or down, subject to the control of the said adjustable gages $e\ e$, by which the blades or shovels may be set to the proper depth, and by their separate independent action adjust themselves to the inequalities or unevenness of surface of the ground.

$a$ is the driver's seat, supported by the crescent-spring $d$, secured to the center-pin in the frame D D by the set-screw $e\ e$ and nut at the bottom of the slot $b$, so that the seat may be adjusted to suit the convenience of the operator.

C is the circular hounds, the front of which has an open clasp, into which the rear of the tongue is inserted, secured by a bolt.

The bracket provided on the front center of the track-beam T may be provided with one similar cultivator-bar complete, with blade or shovel, &c., exactly same as those herein described. The machine will then be admirably adapted for the purpose of a plow-cultivator, greatly facilitating the tillage of the soil in a superior manner for seeding or planting.

I do not claim the revolving star-shields $i\ i$; but

I do claim as new and desire to secure by Letters Patent—

The adjustable cultivator-bars F F, the bed-pieces H H, the adjustable brackets W W, the movable gages $e\ e$, and the scrapers Q Q, when constructed substantially as herein set forth and described, for the purpose specified.

PAUL HILDRETH.

Witnesses:
 HENRY BILLINGS,
 D. W. C. CASTLE.